United States Patent
de Vries et al.

(10) Patent No.: US 12,481,434 B2
(45) Date of Patent: Nov. 25, 2025

(54) SYSTEMS, METHODS, AND MEDIA FOR REDUCING POWER CONSUMPTION OF MULTI-PLANE NON-VOLATILE MEMORY SOLID-STATE DRIVES

(71) Applicant: SK hynix NAND Product Solutions Corporation, Rancho Cordova, CA (US)

(72) Inventors: Jonathan E. de Vries, Folsom, CA (US); David Carlton, Pleasanton, CA (US)

(73) Assignee: SK hynix NAND Product Solutions Corporation, Rancho Cordova, CA (US)

( * ) Notice: Subject to any disclaimer, the term of this patent is extended or adjusted under 35 U.S.C. 154(b) by 0 days.

(21) Appl. No.: 18/243,551

(22) Filed: Sep. 7, 2023

(65) Prior Publication Data

US 2025/0085872 A1  Mar. 13, 2025

(51) Int. Cl.
  *G06F 3/06* (2006.01)
(52) U.S. Cl.
  CPC .......... *G06F 3/0625* (2013.01); *G06F 3/0659* (2013.01); *G06F 3/0679* (2013.01)
(58) Field of Classification Search
  CPC ..... G06F 3/0625; G06F 3/0659; G06F 3/0679
  See application file for complete search history.

(56) References Cited

U.S. PATENT DOCUMENTS

| | | | |
|---|---|---|---|
| 2010/0042774 A1 | 2/2010 | Yang et al. | |
| 2011/0276775 A1* | 11/2011 | Schuetz | G06F 13/1673 711/E12.002 |
| 2013/0166825 A1 | 6/2013 | Kim et al. | |
| 2015/0127914 A1 | 5/2015 | Song et al. | |
| 2017/0336976 A1* | 11/2017 | Lesartre | G06F 3/0659 |
| 2018/0113803 A1 | 4/2018 | Kim et al. | |
| 2020/0135278 A1* | 4/2020 | Palmer | G06F 3/0659 |
| 2021/0233593 A1* | 7/2021 | Palmer | G06F 3/0659 |
| 2022/0043600 A1 | 2/2022 | Moon | |
| 2022/0147480 A1* | 5/2022 | Guo | G06F 12/0246 |
| 2022/0415424 A1* | 12/2022 | Papandreou | G11C 29/42 |
| 2023/0317144 A1* | 10/2023 | Ha | G11C 5/145 365/189.011 |

OTHER PUBLICATIONS

International Search Report and Written Opinion dated Dec. 10, 2024 in International Patent Application No. PCT/US2024/045605, pp. 1-9.

* cited by examiner

*Primary Examiner* — Edward J Dudek, Jr.
(74) *Attorney, Agent, or Firm* — Byrne Poh LLP

(57) ABSTRACT

Mechanisms (which can include systems, methods, and media) for reducing power consumption of multi-plane non-volatile-memory (MPNVM) solid-states drives (SSDs) are provided. The mechanisms include: identifying a first MPNVM device and a first plane of the first MPNVM device associated with a first command; determining that one or more other commands are available for the first MPNVM device and for a plane of the first MPNVM device different from the first plane; and in response to determining that the one or more other commands are available for the first MPNVM device and for a plane of the first MPNVM device different from the first plane, sending the first command and the one or more other commands to the first MPNVM device for execution.

21 Claims, 8 Drawing Sheets

SYSTEMS, METHODS, AND MEDIA FOR REDUCING POWER CONSUMPTION OF MULTI-PLANE NON-VOLATILE MEMORY SOLID-STATE DRIVES

BACKGROUND

Solid-state drives (SSDs) are widely used in grid-powered and battery-powered computing devices to store information. A multi-plane non-volatile memory (MPNVM) SSD is an SSD that includes MPNVM devices making up the SSD, wherein each MPNVM device has multiple planes that can be written to simultaneously on the device. A NAND SSD is one form of MPNVM SSD, and includes NAND devices which are one form of MPNVM device. When reading information from a MPNVM SSD, power is expended not only in operating the general circuitry of a MPNVM device (which can be a portion of the MPNVM SSD) but also in operating a specific plane of the MPNVM device being read from.

In order to improve efficiency and reduce battery drain (in battery powered devices), it is desirable to reduce power consumption of MPNVM SSDs.

Accordingly, new mechanisms for reducing power consumption of MPNVM SSDs are desirable.

SUMMARY

In accordance with some embodiments, mechanisms (which can include systems, methods, and media) for reducing power consumption of MPNVM SSDs are provided.

In some embodiments, systems for reducing power consumption of multi-plane non-volatile-memory (MPNVM) solid-state drives (SSDs) are provided, the systems comprising: memory; and at least one hardware processor coupled to the memory and collectively configured to at least: identify a first MPNVM device and a first plane of the first MPNVM device associated with a first command; determine that one or more other commands are available for the first MPNVM device and for a plane of the first MPNVM device different from the first plane; and in response to determining that the one or more other commands are available for the first MPNVM device and for a plane of the first MPNVM device different from the first plane, send the first command and the one or more other commands to the first MPNVM device for execution. In some of these embodiments, the at least one hardware processor is further collectively configured to: identify a second MPNVM device and a second plane of the second MPNVM device associated with a second command; determine that no other command is available for the second MPNVM device and for a plane of the second MPNVM device different from the second plane; and in response to determining that no other command is available for the second MPNVM device and for a plane of the second MPNVM device different from the second plane: determine that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determine that it is better to send the present command to the second MPNVM device than to wait for another command; and in response to determining that it is better to send the present command to the second MPNVM device than to wait for another command, send the second command to the second MPNVM device for execution. In some of these embodiments, the at least one hardware processor is further collectively configured to: identify a second MPNVM device and a second plane of the second MPNVM device associated with a second command; determine that no other command is available for the second MPNVM device and for a plane of the second MPNVM device different from the second plane; and in response to determining that no other command is available for the second MPNVM device and for a plane of the second MPNVM device different from the second plane: determine that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determine that it is better to wait for another command than to send the present command to the second MPNVM device; and in response to determining that it is better to wait for another command than to send the present command to the second MPNVM device: determine that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, send the second command to the second MPNVM device for execution In some of these embodiments, the at least one hardware processor is further collectively configured to: identify a second MPNVM device and a second plane of the second MPNVM device associated with a second command; determine that no other command is available for the second MPNVM device and for a plane of the second MPNVM device different from the second plane; and in response to determining that no other command is available for the second MPNVM device and for a plane of the second MPNVM device different from the second plane: determine that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determine that it is better to wait for another command than to send the present command to the second MPNVM device; and in response to determining that it is better to wait for another command than to send the present command to the second MPNVM device: determine that the second command can wait for one or more other commands for the second MPNVM device and for a plane of the second MPNVM device different from the second plane; and in response to determining that the second command can wait for one or more other commands for the second MPNVM device and for a plane of the second MPNVM device different from the second plane, mark the second command to be held. In some of these embodiments, the at least one hardware processor is further collectively configured to: identify a second MPNVM device and a second plane of the second MPNVM device associated with a second command; determine that no other command is available for the second MPNVM device and for a plane of the second MPNVM device different from the second plane; and in response to determining that no other command is available for the second MPNVM device and for a plane of the second MPNVM device different from the second plane: determine that one or more commands for the second MPNVM device and for a plane of the second MPNVM device different from the second plane were not sent less than a given period of time ago; and in response to determining that one or more commands for the second MPNVM device and for a plane of the second MPNVM device different from the second plane were not sent less than a given period of time ago: determine that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, send the second command to the second MPNVM device for execution. In some of these embodiments, the at least one hardware processor is further collectively configured to: identify a second MPNVM device and a second plane of the second MPNVM device associated with a second command; determine that no other command is available for the second MPNVM device and for a plane of the second MPNVM device different from the second plane; and in response to determining that no other command is available for the second MPNVM device and for a plane of the second MPNVM device different from the second plane: determine that one or more commands for the second MPNVM device and for a plane of the second MPNVM device different from the second plane were not sent less than a given period of time ago; and in response to determining that one or more commands for the second MPNVM device and for a plane of the second MPNVM device different from the second plane were not sent less than a given period of time ago: determine that the second command can wait for one or more other commands for the second MPNVM device and for a plane of the second MPNVM device different from the second plane; and in response to determining that the second command can wait for one or more other commands for the second MPNVM device and for a plane of the second MPNVM device different from the second plane, mark the second command to be held. In some of these embodiments, the at least one hardware processor is further collectively configured to: identify a second MPNVM device and a second plane of the second MPNVM device associated with a second command; determine that no other command is available for the second MPNVM device and for a plane of the second MPNVM device different from the second plane; and in response to determining that no other command is available for the second MPNVM device and for a plane of the second MPNVM device different from the second plane: determine that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, send the second command to the second MPNVM device for execution.

In some embodiments, methods for reducing power consumption of multi-plane non-volatile-memory (MPNVM) solid-state drives (SSDs) are provided, the methods comprising: identifying a first MPNVM device and a first plane of the first MPNVM device associated with a first command; determining using a hardware processor that one or more other commands are available for the first MPNVM device and for a plane of the first MPNVM device different from the first plane; and in response to determining that the one or more other commands are available for the first MPNVM device and for a plane of the first MPNVM device different from the first plane, send the first command and the one or more other commands to the first MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determining that it is better to send the present command to the second MPNVM device than to wait for another command; and in response to determining that it is better to send the present command to the second MPNVM device than to wait for another command, sending the second command to the second MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determining that it is better to wait for another command than to send the present command to the second MPNVM device; and in response to determining that it is better to wait for another command than to send the present command to the second MPNVM device: determining that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, sending the second command to the second MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determining that it is better to wait for another command than to send the present command to the second MPNVM device; and in response to determining that it is better to wait for another command than to send the present command to the second MPNVM device: determining that the second command can wait for one or more other commands for the second MPNVM device and for a plane of the second MPNVM device different from the second plane; and in response to determining that the second command can wait for one or more other commands for the second MPNVM device and for a plane of the second MPNVM device different from the second plane, marking the second command to be held. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were not sent less than a given period of time ago; and in response to determining that one or more commands for the second MPNVM device and for a plane of the second MPNVM device different from the second plane were not sent less than a given period of time ago: determining that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, sending the second command to the second MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were not sent less than a given period of time ago; and in response to determining that one or more commands for the second MPNVM device and for a plane of the second MPNVM device different from the second plane were not sent less than a given period of time ago: determining that the second command can wait for one or more other commands for the second MPNVM device and for a plane of the second MPNVM device different from the second plane; and in response to determining that the second command can wait for one or more other commands for the second MPNVM device and for a plane of the second MPNVM device different from the second plane, marking the second command to be held. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, sending the second command to the second MPNVM device for execution.

In some embodiments, non-transitory computer-readable media containing computer executable instructions that, when executed by a processor, cause the processor to perform a method for reducing power consumption of multi-plane non-volatile-memory (MPNVM) solid-state drives (SSDs) are provided, the method comprising: identifying a first MPNVM device and a first plane of the first MPNVM device associated with a first command; determining that one or more other commands are available for the first MPNVM device and for a plane of the first MPNVM device different from the first plane; and in response to determining that the one or more other commands are available for the first MPNVM device and for a plane of the first MPNVM device different from the first plane, send the first command and the one or more other commands to the first MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determining that it is better to send the present command to the second MPNVM device than to wait for another command; and in response to determining that it is better to send the present command to the second MPNVM device than to wait for another command, sending the second command to the second MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determining that it is better to wait for another command than to send the present command to the second MPNVM device; and in response to determining that it is better to wait for another command than to send the present command to the second MPNVM device: determining that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, sending the second command to the second MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were sent less than a given period of time ago; and in response to determining that one or more commands for the second MPNVM device and for a plane of the second MPNVM device different from the second plane were sent less than a given period of time ago: determining that it is better to wait for another command than to send the present command to the second MPNVM device; and in response to determining that it is better to wait for another command than to send the present command to the second MPNVM device: determining that the second command can wait for one or more other commands for the second MPNVM device and for a plane of the second MPNVM device different from the second plane; and in response to determining that the second command can wait for one or more other commands for the second MPNVM device and for a plane of the second MPNVM device different from the second plane, marking the second command to be held.

In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were not sent less than a given period of time ago; and in response to determining that one or more commands for the second MPNVM device and for a plane of the second MPNVM device different from the second plane were not sent less than a given period of time ago: determining that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, sending the second command to the second MPNVM device for execution. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that one or more commands for the second MPNVM device and for a plane of the second MPNVM device different from the second plane were not sent less than a given period of time ago; and in response to determining that one or more commands for the second MPNVM device and for a plane of the second MPNVM device different from the second plane were not sent less than a given period of time ago: determining that the second command can wait for one or more other commands for the second MPNVM device and for a plane of the second MPNVM device different from the second plane; and in response to determining that the second command can wait for one or more other commands for the second MPNVM device and for a plane of the second MPNVM device different from the second plane, marking the second command to be held. In some of these embodiments, the method further comprises: identifying a second MPNVM device and a second plane of the second MPNVM device associated with a second command; determining that no other command is available for the second MPNVM device and for a plane of the second MPNVM device different from the second plane; and in response to determining that no other command is available for the second MPNVM device and for a plane of the second MPNVM device different from the second plane: determining that the second command cannot wait for one or more other commands for the second MPNVM device and for a plane of the second MPNVM device different from the second plane; and in response to determining that the second command cannot wait for one or more other commands for the second MPNVM device and for a plane of the second MPNVM device different from the second plane, sending the second command to the second MPNVM device for execution.

DETAILED DESCRIPTION

In accordance with some embodiments, mechanisms (which can include systems, methods, and media) for reducing power consumption of MPNVM SSDs are provided.

As noted above, when reading information from a MPNVM SSD, power is expended not only in operating the general circuitry of a MPNVM device (which can be a portion of the MPNVM SSD) but also in operating a specific plane of the MPNVM device being read from.

In accordance with some embodiments, mechanisms (which can include systems, methods, and media) for reducing power consumption of MPNVM SSDs as described herein cause two or more read commands on different planes of a MPNVM device of the MPNVM SSD to get executed at least partially simultaneously so that periphery power consumption of the MPNVM device is reduced as compared to the periphery power that would have been used had the two or more read commands been executed at different times.

Figure 1:
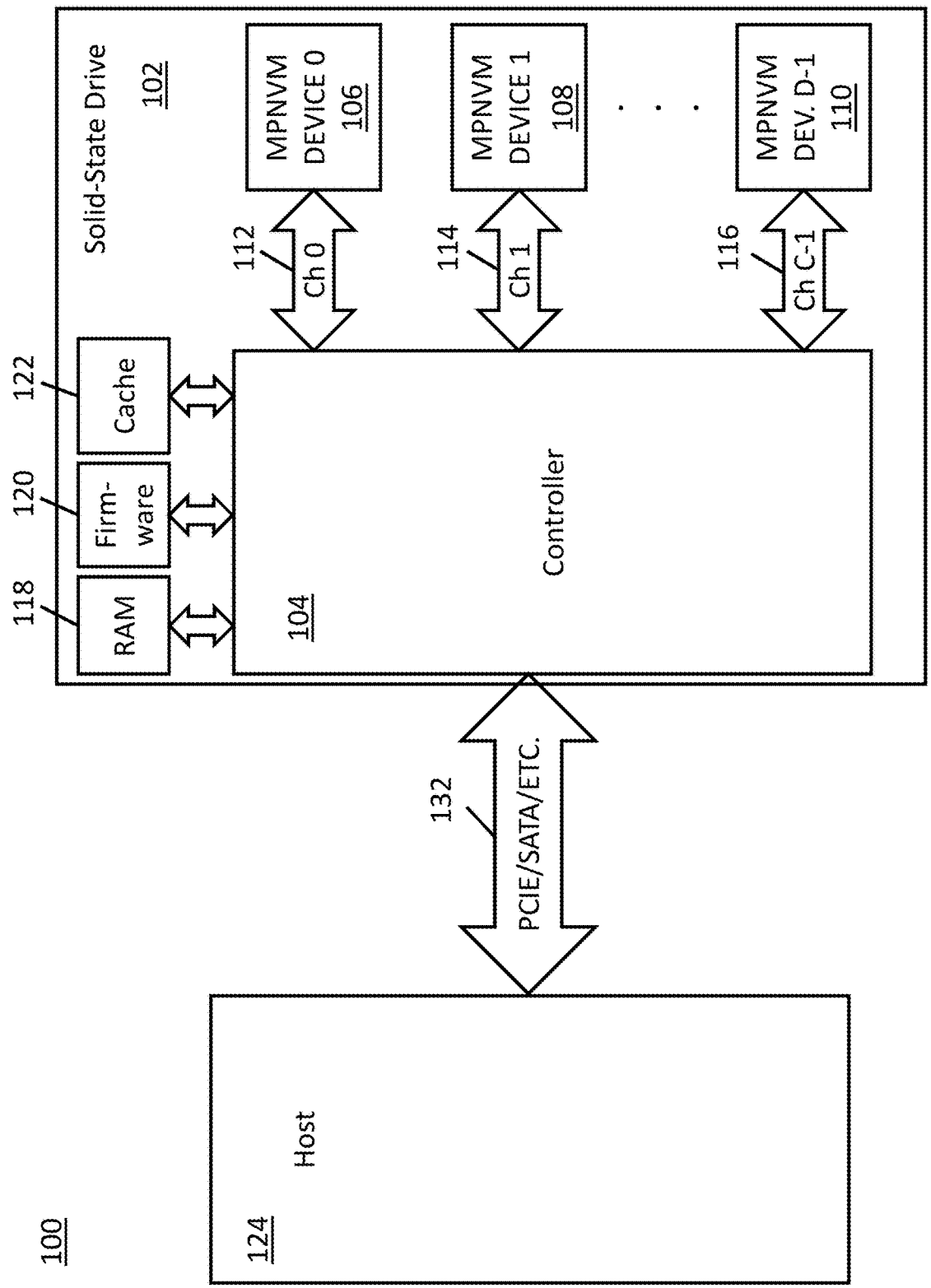
FIG. 1 is an example of block diagram of a solid-state drive coupled to a host device via a bus in accordance with some embodiments.

Turning to FIG. 1, an example block diagram of a solid-state drive 102 coupled to a host device 124 via a bus 132 in accordance with some embodiments is illustrated.

As shown, solid-state drive 102 can include a controller 104, MPNVM devices 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc.

MPNVM devices 106, 108, and 110 can be any suitable MPNVM devices for storing information (which can include data, programs, and/or any other suitable information that can be stored in a solid-state drive) in some embodiments. The MPNVM devices can include any suitable memory cells, hardware processor(s) (such as a microprocessor, a digital signal processor, a microcontroller, a programmable gate array, etc.), interface controller(s), interface logic, drivers, etc. in some embodiments. While three MPNVM devices (106, 108, and 110) are shown in FIG. 1, any suitable number D of MPNVM devices (including only one) can be used in some embodiments. Any suitable type of MPNVM devices can be used, such as multi-plane NAND devices (such as single-level cell (SLC), multilevel cell (MLC), triple-level cell (TLC), quad-level cell (QLC), penta-level cell (PLC), 3D NAND, etc.) in some embodiments. Each MPNVM device can have any suitable size in some embodiments. As noted above, in some embodiments, devices 106, 108, and 110 can be multi-plane NAND devices, however, the devices can additionally or alternatively use any other suitable multi-plane storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and MPNVM device 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

Bus 132 can be any suitable bus for communicating information (which can include data and/or programs in some embodiments), in some embodiments. For example, in some embodiments, bus 132 can be a PCIE bus, a SATA bus, or any other suitable bus.

Figure 2:
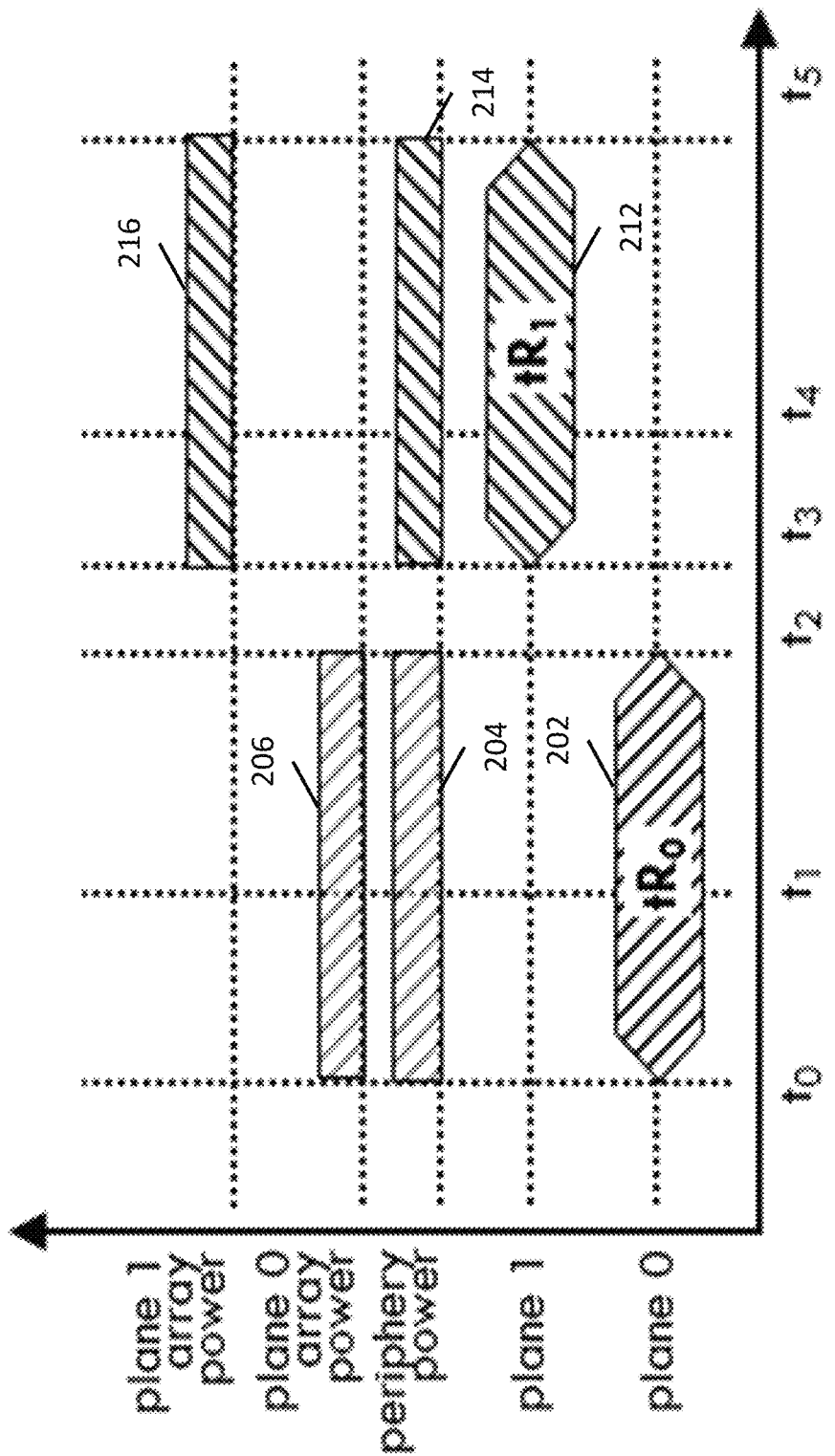
FIG. 2 is an example of power consumption with non-overlapping commands in accordance with some embodiments.

Turning to FIG. 2, an example of the execution of two read commands at different times is illustrated. As shown, a first read command 202 gets executed on plane 0 between times $t_0$ and $t_2$ and a second read command 212 gets executed on plane 1 between times $t_3$ and $t_5$. As also shown, during the execution of the first read command (i.e., between times $t_0$ and $t_2$), periphery power 204 and plane 0 array power 206 are used, and during the execution of the second read command (i.e., between times $t_3$ and $t_5$), periphery power 214 and plane 1 array power 216 are used. If the periphery power used during a read command is X and the array power used during a read command is Y, the power used over the course of these two commands can be represented as:

$$X(t_2 - t_0) + Y(t_2 - t_0) + X(t_5 - t_3) + Y(t_5 - t_3)$$

Figure 3:
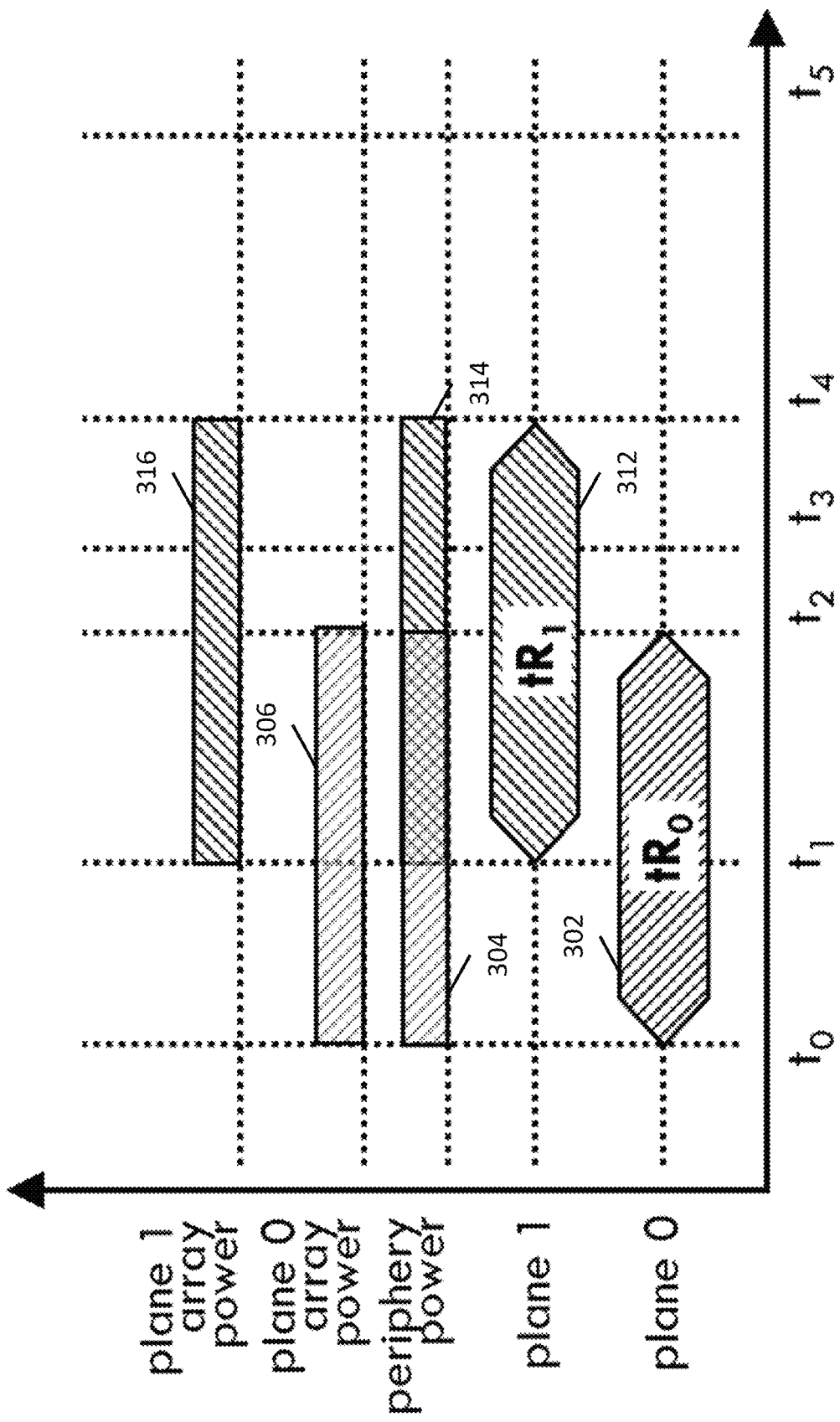
FIG. 3 is an example of power consumption with partially-overlapping commands in accordance with some embodiments.

Turning to FIG. 3, an example of the execution of two read commands at partially the same time is illustrated. As shown, a first read command 302 gets executed on plane 0 between times $t_0$ and $t_2$ and a second read command 312 gets executed on plane 1 between times $t_1$ and $t_4$. As also shown, during the execution of the first read command (i.e., between times $t_0$ and $t_2$), periphery power 304 and plane 0 array power 306 are used, and during the execution of the second read command (i.e., between times $t_1$ and $t_4$), periphery power 314 and plane 1 array power 316 are used. If the periphery power used during a read command is X and the array power used during a read command is Y, the power used over the course of these two commands can be represented as:

$$X(t_4 - t_0) + Y(t_2 - t_0) + Y(t_4 - t_1)$$

Because of the overlap of periphery power usages 304 and 314 between $t_1$ and $t_2$, a power savings of $X(t_2-t_1)$ is realized compared to what would be the case if the same commands were executed separately. That is, because, at any given point in time, periphery power is the same whether used by one command or by more than one command, an overlap in the use of periphery power by multiple commands results in a power savings.

Figure 4:
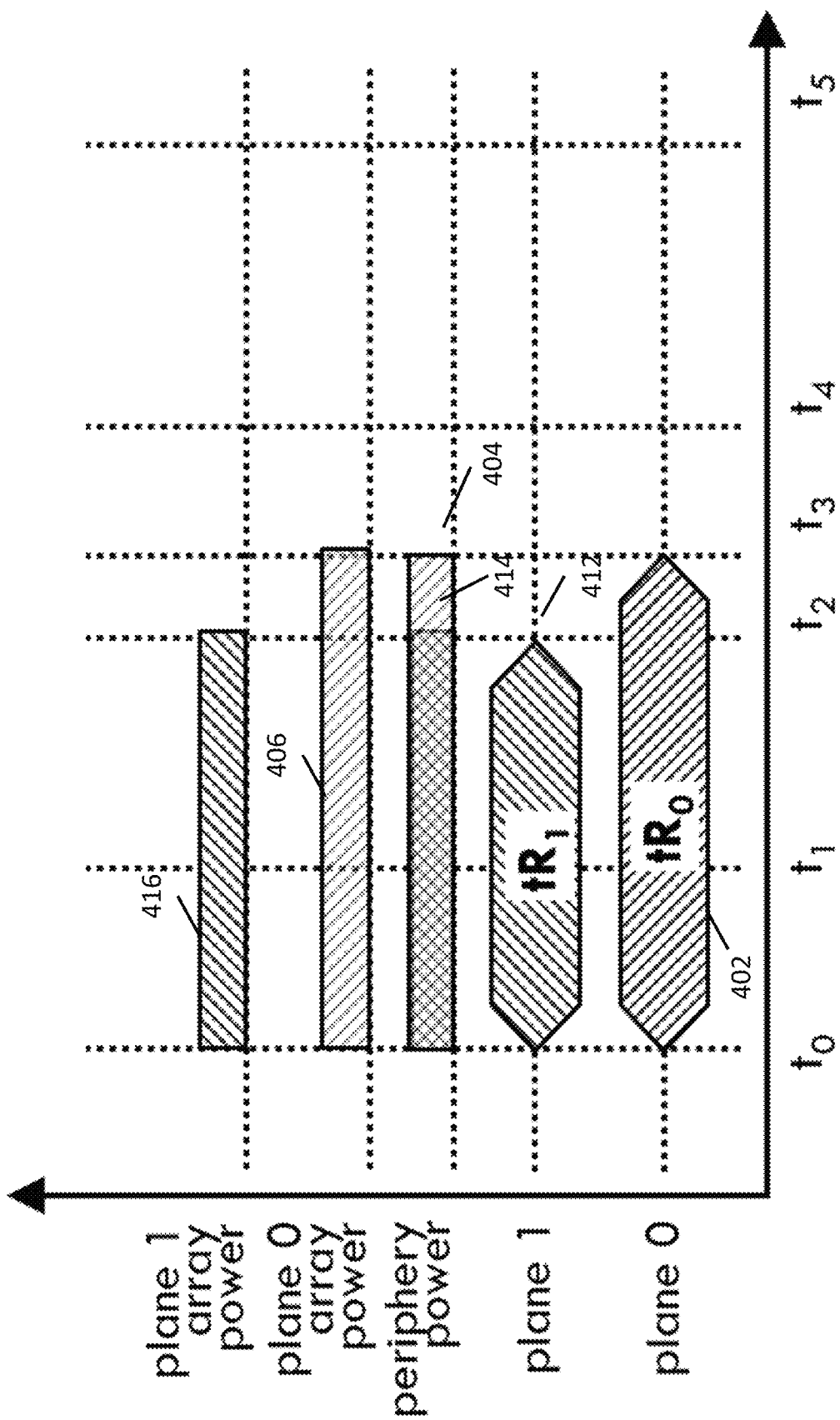
FIG. 4 is another example of power consumption with partially-overlapping commands in accordance with some embodiments.

Turning to FIG. 4, another example of the execution of two read commands at partially the same time is illustrated. As shown, a first read command 402 gets executed on plane 0 between times $t_0$ and $t_3$ and a second read command 412 gets executed on plane 1 between times $t_0$ and $t_2$. As also shown, during the execution of the first read command (i.e., between times $t_0$ and $t_3$), periphery power 404 and plane 0 array power 406 are used, and during the execution of the second read command (i.e., between times $t_0$ and $t_2$), periphery power 414 and plane 1 array power 416 are used. If the periphery power used during a read command is X and the array power used during a read command is Y, the power used over the course of these two commands can be represented as:

$$X(t_3 - t_0) + Y(t_3 - t_0) + Y(t_2 - t_0)$$

Because of the overlap of periphery power usages 404 and 414 between $t_0$ and $t_2$, a power savings of $X(t_2-t_0)$ is realized compared to what would be the case if the same commands were executed separately.

Figure 5:
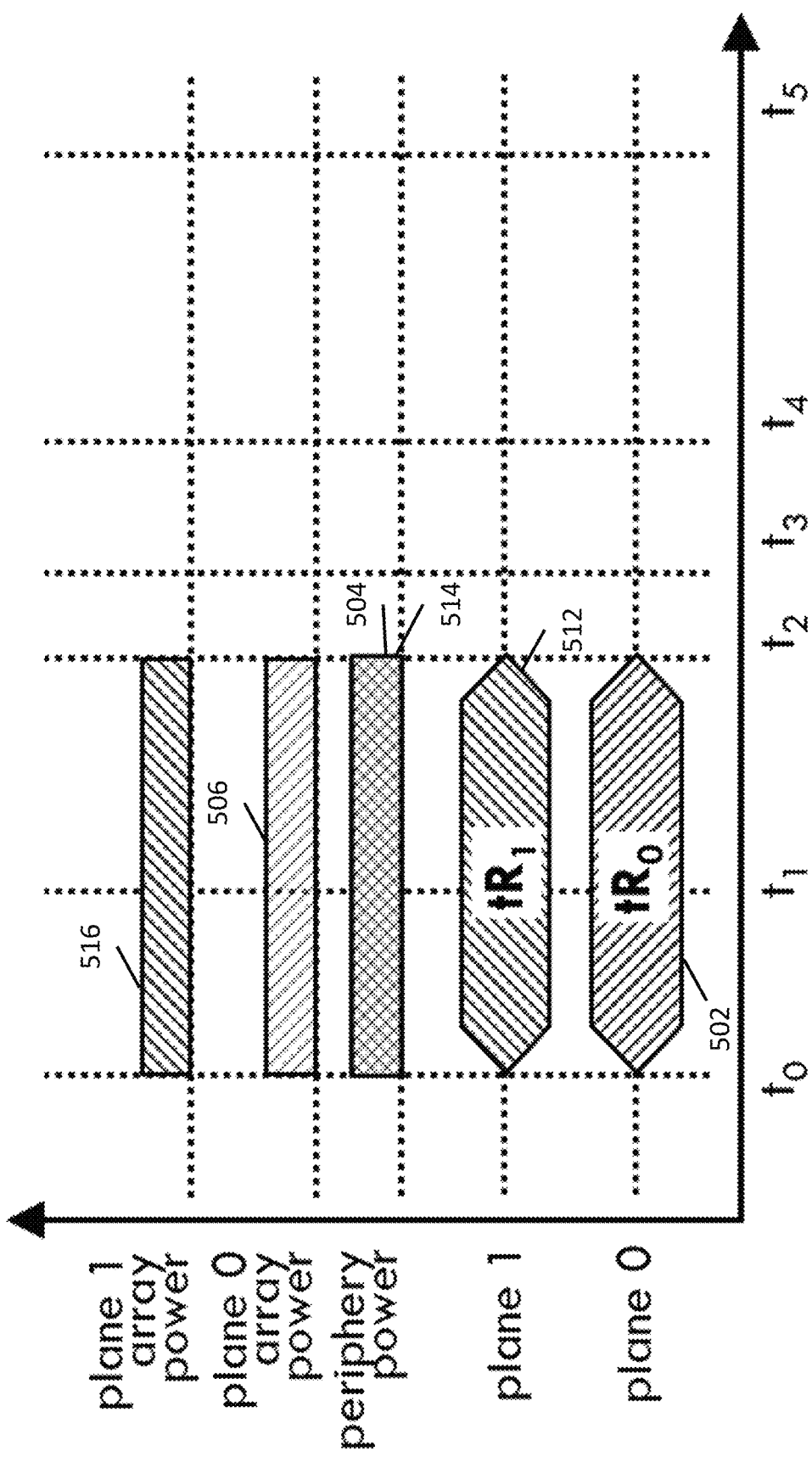
FIG. 5 is another example of power consumption with completely-overlapping commands in accordance with some embodiments.

Turning to FIG. 5, another example of the execution of two read commands at completely the same time is illustrated. As shown, a first read command 502 gets executed on plane 0 between times $t_0$ and $t_2$ and a second read command 512 gets executed on plane 1 between times $t_0$ and $t_2$. As also shown, during the execution of the first read command (i.e., between times $t_0$ and $t_2$), periphery power 504 and plane 0 array power 506 are used, and during the execution of the second read command (i.e., between times $t_0$ and $t_2$), periphery power 514 and plane 1 array power 516 are used. If the periphery power used during a read command is X and the array power used during a read command is Y, the power used over the course of these two commands can be represented as:

$$X(t_2 - t_0) + Y(t_2 - t_0) + Y(t_2 - t_0)$$

Because of the overlap of periphery power usages 504 and 514 between $t_0$ and $t_2$, a power savings of $X(t_2-t_0)$ is realized compared to what would be the case if the same commands were executed separately.

Figure 6:
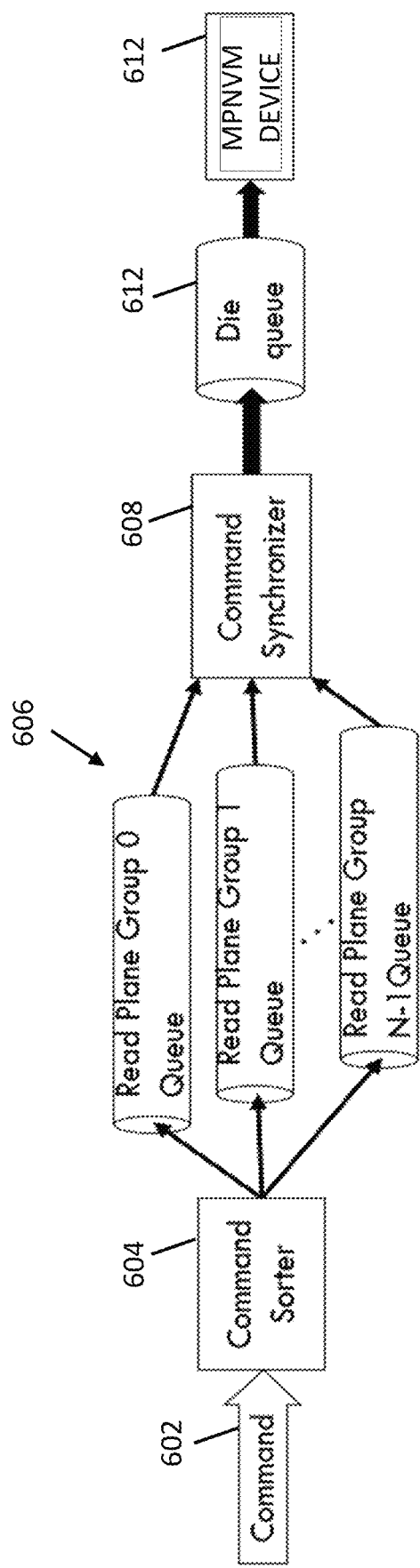
FIG. 6 is an example of a flow diagram showing the flow of commands from receipt at a solid-state drive controller to execution of the command on a NAND device in accordance with some embodiments.

Turning to FIG. 6, an example of a flow diagram showing the flow of commands from receipt at a solid-state drive controller, such as controller 104 of FIG. 1, to execution of the command on a MPNVM device, such as MPNVM device 106, 108, or 110 of FIG. 1, is provided.

As illustrated, this flow begins at 602 when a command is received by a solid-state drive controller, such as controller 104 of FIG. 1. Any suitable command can be received and the command can be received in any suitable manner, in some embodiments. For example, the command can be a read command and the command can be received as a transmission over bus 132 from host 124, in some embodiments. More particularly, the command can be a host command (e.g., a high priority command) or a system command (garbage collection command, etc.), in some embodiments.

Next, command sorter 604 sorts the command into one of read plane group queues 606. Command sorter 604 can be implemented in any suitable manner, such as by software executing on controller 104 of FIG. 1, in some embodiments. Command sorter 604 can select read plane group queues 606 in any suitable manner, in some embodiments. For example, in some embodiments, command sorter 604 can select one of queues 606 based upon a plane or plane group identified in the command and place the command into the corresponding queue.

Each read plane group queue 606 can store a set of commands waiting to be processed by a command synchronizer 608. For example, a read plane group 0 queue can store command destined for a plane 0 or plane group 0 of an MPNVM device, in some embodiments. As another example, a read plane group 1 queue can store command destined for a plane 1 or plane group 1 of an MPNVM device, in some embodiments. As yet another example, a read plane group N−1 queue can store command destined for a plane N−1 or plane group N−1 of an MPNVM device, in some embodiments. Any suitable number of read plane group queues 606 can be implemented, in some embodiments. The read plane group queues can store commands in any suitable manner in some embodiments. For example, in some embodiments, each read plane group queue can store commands using a sequential access approach (e.g., such as a first-in, first-out (FIFO) approach), a random-access approach, or some combination of the same. Read plane group queues 606 can be implemented in any suitable hardware or combination of hardware, in some embodiments. For example, in some embodiments, read plane group queues 606 can be implemented in controller 104 and/or RAM 118.

Command synchronizer 608 can then control the sending of commands to an MPNVM device 612. Command synchronizer can be implemented on controller 104 and perform functions as described below in connection with FIGS. 7 and 8, in some embodiments.

Die queue 612 can be any suitable mechanism for queueing commands being sent to MPNVM device 612. For example, in some embodiments, die queue 612 can be implemented using: controller 104; controller 104 and RAM 118; controller 104, RAM 118, and firmware 120; and/or in a channel 112, 114, or 116, of FIG. 1.

MPNVM device 612 can be implemented in any suitable MPNVM device. For example, MPNVM device 612 can be implemented as MPNVM device 106, 108, or 110 of FIG. 1, in some embodiments.

Figure 7:
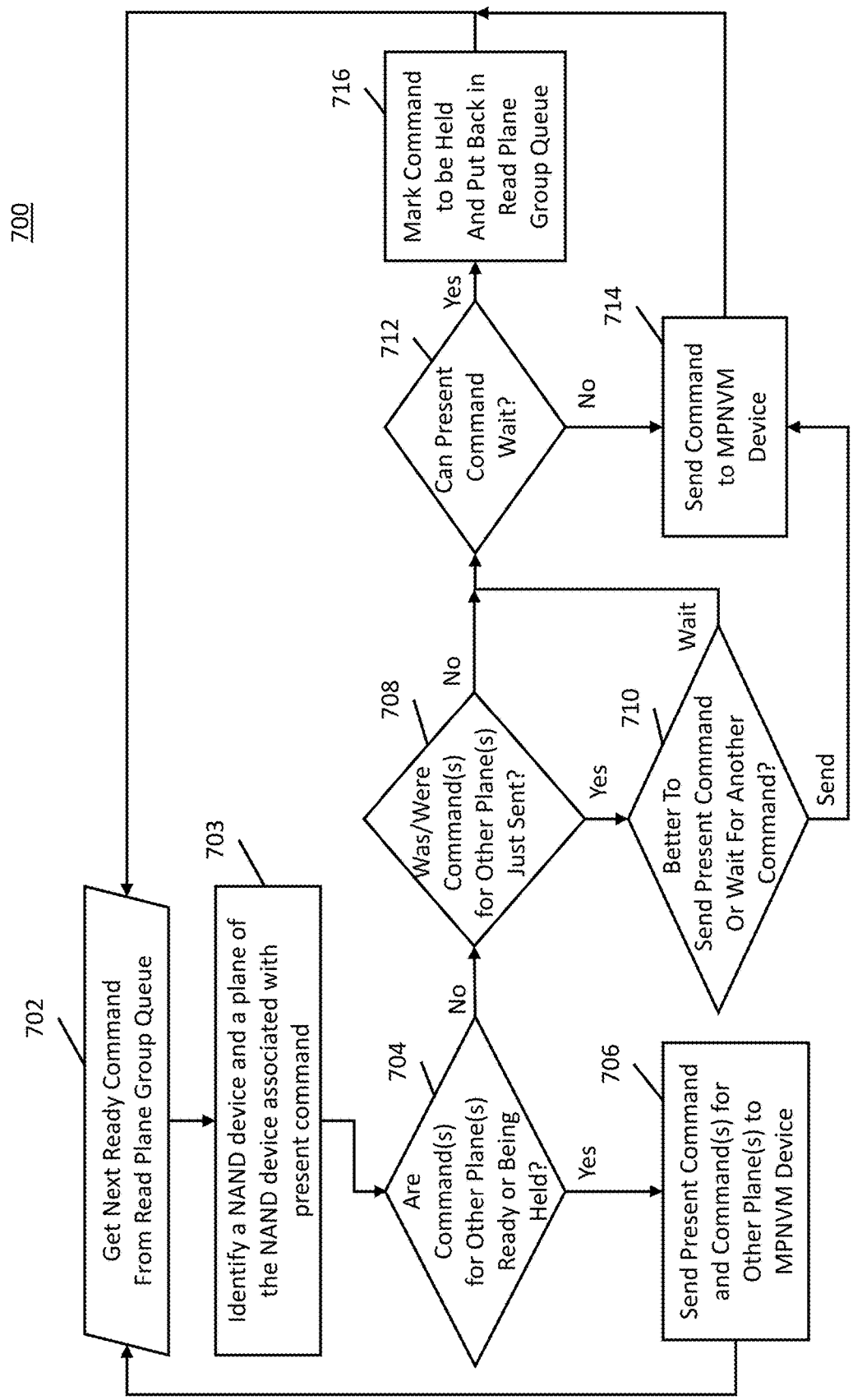
FIG. 7 is an example of a process for synchronizing commands in accordance with some embodiments.

Turning to FIG. 7, an example 700 of a process for synchronizing commands in accordance with some embodiments is illustrated.

As shown, process 700 begins by obtaining a next ready command from a read plane group queue. Any suitable command can be obtained as the next ready command, the next ready command can be obtained from any suitable read plane group queue, and the next read command can be obtained in any suitable manner, in some embodiments. For example, in some embodiments, the next ready command can be the oldest read command, or the read command with the highest priority, in a set of read plane group queues. As another example, in some embodiments, the next ready command can be obtained from a read plane group queue holding the oldest command, or highest priority command, not being held (as described below). As yet another example, in some embodiments, the next ready command can be obtained from a queue by moving the command out of the queue and into memory used by process 700. Once obtained, the next ready command can be referred to as the present command.

Then, at 703, process 700 can identify a MPNVM device and a plane of the MPNVM device associated with present command. This determination can be made in any suitable manner, in some embodiments, such as by inspecting the contents of the command.

Next, at 704, process 700 can determine whether one or more other commands for the associated MPNVM device and one or more planes of the MPNVM device other than the associated plane are ready or being held in any of the read plane group queues. This determination can be made in any suitable manner, in some embodiments. For example, in some embodiments, this determination can be made by checking all of the commands in the read plane group queues to see if any command(s) are for the associated MPNVM device and one or more planes of the MPNVM device other than the associated plane.

If it is determined at 704 that there are one or more commands ("the matching command(s)") for the associated MPNVM device and one or more planes of the MPNVM device other than the associated plane, process 700 can proceed to 706 at which it can send the present command and the matching command(s) to the associated MPNVM device, and delete the matching command(s) from the corresponding queues. Process 700 can send the present command and the matching command(s) to the associated MPNVM device in any suitable manner, in some embodiments. For example, in some embodiments, process 700 can send these commands by transmitting them across a channel 112, 114, or 116 associated with the MPNVM device. After 706, process 700 can loop back to 702.

However, if it is determined at 704 that there are no commands for the associated MPNVM device and one or more planes of the MPNVM device other than the associated plane, process 700 can proceed to 708 at which it can determine whether any commands for the associated MPNVM device and one or more planes of the MPNVM device other than the associated plane were just sent to the MPNVM device. Whether a command qualifies as being just sent can be determined in any suitable manner, in some embodiments. For example, in some embodiments, a command can be determined as being just sent if the command was sent recently enough that the command would more likely than not still be executing if the present command was sent to the MPNVM device at 714, described below. As another example, in some embodiments, a command can be determined as being just sent if the command was sent less than a threshold period of time ago.

If process 700 determines at 710 that one or more commands for the associated MPNVM device and one or more planes of the MPNVM device other than the associated plane were just sent to the MPNVM device, the process can proceed to 710 at which it can determine whether it is better to send the present command to the MPNVM device now or hold the present command to wait for one or more other commands with which it can be later matched at 704 and sent at 706. Process 700 can determine whether it is better to send the present command to the MPNVM device now or hold the present command to wait for one or more other command(s) with which it can be later matched and sent in any suitable manner, in some embodiments. For example, in some embodiments, process 700 can determine the likely power savings to be realized by sending the present command to the MPNVM device now and the likely power savings to be realized by holding the present command to wait for one or more other command(s) with which it can be later matched and sent, and selecting sending or waiting based on the corresponding power savings that is higher.

If, at 710, process 700 determines that sending the present command to the MPNVM device now is better, process 700 can proceed to 714 at which it can send the command to the MPNVM device. Process 700 can send the present command to the associated MPNVM device in any suitable manner, in some embodiments. For example, in some embodiments, process 700 can send the command by transmitting it across a channel 112, 114, or 116 associated with the MPNVM device. After sending the command at 714, process 700 can loop back to 702.

However, if, at 710, process 700 determines that holding the present command to wait for one or more other commands with which it can be later matched and sent is better, process 700 can proceed to 712 at which it can determine whether the present command can wait. This determination can be made in any suitable manner, in some embodiments. For example, in some embodiments, this determination can be made by determining whether the type of command can wait, whether some characteristic of the command dictates that it can wait, and/or based on any other suitable criteria or criterion.

If it is determined at 712 that the present command cannot wait, then process 700 can proceed to 714 at which the present command can be sent to the MPNVM device, as described above.

However, if it is determined at 712 that the present command can wait, then process 700 can proceed to 716 at which the command can be marked to be held and put back in the read plane group queue from which it was obtained. The command can be marked to be held in any suitable manner, in some embodiments, such as by setting a flag in the read plane group queue associated with the command.

Although 702 is described as removing a command from a read plane group queue, and 716 is described as putting the command back in the read plane group queue, it should be understood that, in some embodiments, the command can be observed at 702 while being left in the queue, and marked to be held at 716 while not being put back in the queue, in some embodiments. In such embodiments, when the command is sent at 706 or 714, the command would be deleted from the queue.

Although 716 is described as marking the command to be held putting the command back in the read plane group queue, it should be understood that, in some embodiments, the command can be alternatively placed in a different storage location at 716, which can be checked for matching commands at 704, in some embodiments.

Figure 8:
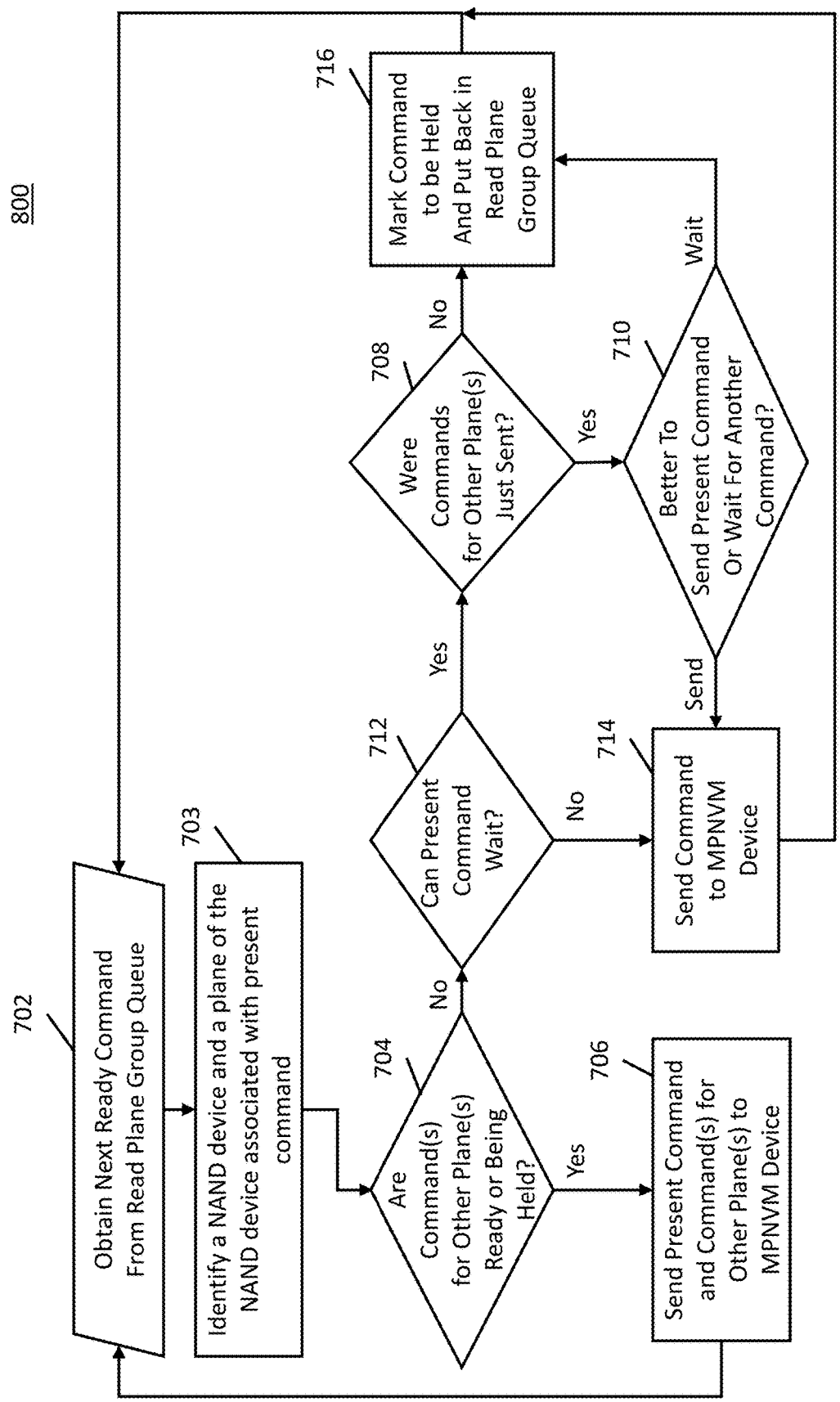
FIG. 8 is another example of a process for synchronizing commands in accordance with some embodiments.

FIG. 8 is another example 800 of a process for synchronizing commands in accordance with some embodiments. As shown, process 800 includes 702, 703, 704, 706, 708, 710, 712, 714, and 716, which are the same as described above in connection with FIG. 7, except that that order of these blocks is partially changed.

In some embodiments, at least some of the above-described blocks of the processes of FIGS. 7 and 8 can be executed or performed in any order or sequence not limited to the order and sequence shown in and described in connection with the figures.

Also, some of the above blocks of the processes of FIGS. 7 and 8 can be executed or performed substantially simultaneously where appropriate or in parallel to reduce latency and processing times in some embodiments.

Additionally or alternatively, some of the above described blocks of the processes of FIGS. 7 and 8 can be omitted in some embodiments. For example, in FIG. 7, in some embodiments, blocks 708 and 710 can be omitted and the "No" branch from 704 can cause process 700 to proceed to 712. As another example, in FIG. 8, in some embodiments, blocks 708 and 710 can be omitted and the "Yes" branch from 712 can cause process 700 to proceed to 716.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable non-transitory tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen from the description above, new mechanisms (which can include systems, methods, and media) for reducing power consumption of MPNVM SSDs are provided. As described above, these mechanisms can reduce power consumption of MPNVM SSDs, make the devices more efficient, and reduce battery power consumption, in some embodiments.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for reducing power consumption of multi-plane non-volatile-memory (MPNVM) solid-state drives (SSDs), comprising:

memory; and at least one hardware processor coupled to the memory and collectively configured to at least:

identify a first MPNVM device and a first plane of the first MPNVM device associated with a first command;

determine that no other command is available for the first MPNVM device and for a plane of the first MPNVM device different from the first plane; and in response to determining that no other command is available for the first MPNVM device and for a plane of the first MPNVM device different from the first plane:

determine whether one or more commands for the first MPNVM device and for a plane of the first MPNVM device different from the first plane were sent less than a given period of time ago; and based on the determining of whether one or more commands for the first MPNVM device and for a plane of the first MPNVM device different from the first plane were sent less than a given period of time ago, cause an action to be taken on the first command.

2. The system of claim 1, wherein determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and causing the action to be taken on the first command comprises, in response to determining that one or more commands for the first MPNVM device and for a plane of the first MPNVM device different from the first plane were sent less than a given period of time ago:

determining that it is better to send the present command to the first MPNVM device than to wait for another command; and in response to determining that it is better to send the present command to the first MPNVM device than to wait for another command, sending the first command to the first MPNVM device for execution.

3. The system of claim 1, wherein determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and causing the action to be taken on the first command comprises, in response to determining that one or more commands for the first MPNVM device and for a plane of the first MPNVM device different from the first plane were sent less than a given period of time ago:

determine that it is better to wait for another command than to send the present command to the first MPNVM device; and in response to determining that it is better to wait for another command than to send the present command to the first MPNVM device:

determine that the first command cannot wait for one or more other commands for the first MPNVM device and for a plane of the first MPNVM device different from the first plane; and in response to determining that the first command cannot wait for one or more other commands for the first MPNVM device and for a plane of the first MPNVM device different from the first plane, send the first command to the first MPNVM device for execution.

4. The system of claim 1, wherein
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and
causing the action to be taken on the first command comprises, in response to determining that one or more commands for the first MPNVM device and for a plane of the first MPNVM device different from the first plane were sent less than a given period of time ago:
 determine that it is better to wait for another command than to send the present command to the first MPNVM device; and
 in response to determining that it is better to wait for another command than to send the present command to the first MPNVM device:
  determine that the first command can wait for one or more other commands for the first MPNVM device and for a plane of the first MPNVM device different from the first plane; and
  in response to determining that the first command can wait for one or more other commands for the first MPNVM device and for a plane of the first MPNVM device different from the first plane, mark the first command to be held.

5. The system of claim 1, wherein
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were not sent less than a given period of time ago; and
causing the action to be taken on the first command comprises, in response to determining that one or more commands for the first MPNVM device and for a plane of the first MPNVM device different from the first plane were not sent less than a given period of time ago:
 determine that the first command cannot wait for one or more other commands for the first MPNVM device and for a plane of the first MPNVM device different from the first plane; and
 in response to determining that the first command cannot wait for one or more other commands for the first MPNVM device and for a plane of the first MPNVM device different from the first plane, send the first command to the first MPNVM device for execution.

6. The system of claim 1, wherein
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were not sent less than a given period of time ago; and
causing the action to be taken on the first command comprises, in response to determining that one or more commands for the first MPNVM device and for a plane of the first MPNVM device different from the first plane were not sent less than a given period of time ago:
 determine that the first command can wait for one or more other commands for the first MPNVM device and for a plane of the first MPNVM device different from the first plane; and
 in response to determining that the first command can wait for one or more other commands for the first MPNVM device and for a plane of the first MPNVM device different from the first plane, mark the first command to be held.

7. The system of claim 1, wherein the at least one hardware processor is further collectively configured to:
identify a second MPNVM device and a second plane of the second MPNVM device associated with a second command;
determine that one or more other commands are available for the second MPNVM device and for a plane of the second MPNVM device different from the second plane, wherein sending of the one or more other commands for execution was being delayed for matching with one or more subsequent commands for the second MPNVM device; and
in response to determining that the one or more other commands are available for the second MPNVM device and for a plane of the second MPNVM device different from the second plane, send the second command and the one or more other commands to the second MPNVM device for execution.

8. A method for reducing power consumption of multi-plane non- volatile-memory (MPNVM) solid-state drives (SSDs), comprising:
identifying a first MPNVM device and a first plane of the first MPNVM device associated with a first command;
determining that no other command is available for the first MPNVM device and for a plane of the first MPNVM device different from the first plane; and
in response to determining that no other command is available for the first MPNVM device and for a plane of the first MPNVM device different from the first plane:
 determining whether one or more commands for the first MPNVM device and for a plane of the first MPNVM device different from the first plane were sent less than a given period of time ago; and
 based on the determining of whether one or more commands for the first MPNVM device and for a plane of the first MPNVM device different from the first plane were sent less than a given period of time ago, causing an action to be taken on the first command.

9. The method of claim 8, wherein:
determining whether one or more commands for the first MPNVM device and for a plane of the first MPNVM device different from the first plane were sent less than a given period of time ago comprises determining that one or more commands for the first MPNVM device and for a plane of the first first MPNVM device different from the first plane were sent less than a given period of time ago; and causing the action to be taken on the first command comprises, in response to determining that one or more commands for the first MPNVM device and for a plane of the first MPNVM device different from the first plane were sent less than a given period of time ago:
  determining that it is better to send the present command to the first MPNVM device than to wait for another command; and
  in response to determining that it is better to send the present command to the first MPNVM device than to wait for another command, sending the first command to the first MPNVM device for execution.

10. The method of claim 8, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and
causing the action to be taken on the first command comprises, in response to determining that one or more commands for the first MPNVM device and for a plane of the first MPNVM device different from the first plane were sent less than a given period of time ago:
  determining that it is better to wait for another command than to send the present command to the first MPNVM device; and
  in response to determining that it is better to wait for another command than to send the present command to the first MPNVM device:
    determining that the first command cannot wait for one or more other commands for the first MPNVM device and for a plane of the first MPNVM device different from the first plane; and
    in response to determining that the first command cannot wait for one or more other commands for the first MPNVM device and for a plane of the first MPNVM device different from the first plane, sending the first command to the first MPNVM device for execution.

11. The method of claim 8, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and
causing the action to be taken on the first command comprises, in response to determining that one or more commands for the first MPNVM device and for a plane of the first MPNVM device different from the first plane were sent less than a given period of time ago:
  determining that it is better to wait for another command than to send the present command to the first MPNVM device; and
  in response to determining that it is better to wait for another command than to send the present command to the first MPNVM device:
    determining that the first command can wait for one or more other commands for the first MPNVM device and for a plane of the first MPNVM device different from the first plane; and
    in response to determining that the first command can wait for one or more other commands for the first MPNVM device and for a plane of the first MPNVM device different from the first plane, marking the first command to be held.

12. The method of claim 8, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were not sent less than a given period of time ago; and
causing the action to be taken on the first command comprises, in response to determining that one or more commands for the first MPNVM device and for a plane of the first MPNVM device different from the first plane were not sent less than a given period of time ago:
  determining that the first command cannot wait for one or more other commands for the first MPNVM device and for a plane of the first MPNVM device different from the first plane; and
  in response to determining that the first command cannot wait for one or more other commands for the first MPNVM device and for a plane of the first MPNVM device different from the first plane, sending the first command to the first MPNVM device for execution.

13. The method of claim 8, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were not sent less than a given period of time ago; and
causing the action to be taken on the first command comprises, in response to determining that one or more commands for the first MPNVM device and for a plane of the first MPNVM device different from the first plane were not sent less than a given period of time ago:
  determining that the first command can wait for one or more other commands for the first MPNVM device and for a plane of the first MPNVM device different from the first plane; and
  in response to determining that the first command can wait for one or more other commands for the first MPNVM device and for a plane of the first MPNVM device different from the first plane, marking the first command to be held.

14. The method of claim 8, further comprising:
identifying a second MPNVM device and a second plane of the second MPNVM device associated with a second command;
determining that one or more other commands are available for the second MPNVM device and for a plane of the second MPNVM device different from the second plane, wherein sending of the one or more other commands for execution was being delayed for matching with one or more subsequent commands for the second MPNVM device; and
in response to determining that the one or more other commands are available for the second MPNVM device and for a plane of the second MPNVM device different from the second plane, sending the second command and the one or more other commands to the second MPNVM device for execution.

15. A non-transitory computer-readable medium containing computer executable instructions that, when executed by a processor, cause the processor to perform a method for reducing power consumption of multi-plane non-volatile-memory (MPNVM) solid-state drives (SSDs), the method comprising:
identifying a first MPNVM device and a first plane of the first MPNVM device associated with a first command;
determining that no other command is available for the first MPNVM device and for a plane of the first MPNVM device different from the first plane; and
in response to determining that no other command is available for the first MPNVM device and for a plane of the first MPNVM device different from the first plane:
determining whether one or more commands for the first MPNVM device and for a plane of the first MPNVM device different from the first plane were sent less than a given period of time ago; and
based on the determining of whether one or more commands for the first MPNVM device and for a plane of the first MPNVM device different from the first plane were sent less than a given period of time ago, causing an action to be taken on the first command.

16. The non-transitory computer-readable medium of claim 15, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and
causing the action to be taken on the first command comprises, in response to determining that one or more commands for the first MPNVM device and for a plane of the first MPNVM device different from the first plane were sent less than a given period of time ago:
determining that it is better to send the present command to the first MPNVM device than to wait for another command; and
in response to determining that it is better to send the present command to the first MPNVM device than to wait for another command, sending the first command to the first MPNVM device for execution.

17. The non-transitory computer-readable medium of claim 15, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and
causing the action to be taken on the first command comprises, in response to determining that one or more commands for the first MPNVM device and for a plane of the first MPNVM device different from the first plane were sent less than a given period of time ago:
determining that it is better to wait for another command than to send the present command to the first MPNVM device; and
in response to determining that it is better to wait for another command than to send the present command to the first MPNVM device:
determining that the first command cannot wait for one or more other commands for the first MPNVM device and for a plane of the first MPNVM device different from the first plane; and
in response to determining that the first command cannot wait for one or more other commands for the first MPNVM device and for a plane of the first MPNVM device different from the first plane, sending the first command to the first MPNVM device for execution.

18. The non-transitory computer-readable medium of claim 15, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were sent less than a given period of time ago; and
causing the action to be taken on the first command comprises, in response to determining that one or more commands for the first MPNVM device and for a plane of the first MPNVM device different from the first plane were sent less than a given period of time ago:
determining that it is better to wait for another command than to send the present command to the first MPNVM device; and
in response to determining that it is better to wait for another command than to send the present command to the first MPNVM device:
determining that the first command can wait for one or more other commands for the first MPNVM device and for a plane of the first MPNVM device different from the first plane; and
in response to determining that the first command can wait for one or more other commands for the first MPNVM device and for a plane of the first MPNVM device different from the first plane, marking the first command to be held.

19. The non-transitory computer-readable medium of claim 15, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were not sent less than a given period of time ago; and
causing the action to be taken on the first command comprises, in response to determining that one or more commands for the first MPNVM device and for a plane of the first MPNVM device different from the first plane were not sent less than a given period of time ago:
determining that the first command cannot wait for one or more other commands for the first MPNVM device and for a plane of the first MPNVM device different from the first plane; and
in response to determining that the first command cannot wait for one or more other commands for the first MPNVM device and for a plane of the first MPNVM device different from the first plane, sending the first command to the first MPNVM device for execution.

20. The non-transitory computer-readable medium of claim 15, wherein:
determining whether one or more commands for the first MPNVM device and for a plane of the first MPNVM device different from the first plane were sent less than a given period of time ago comprises determining that one or more commands for the first MPNVM device and for a plane of the first MPNVM device different from the first plane were not sent less than a given period of time ago; and
causing the action to be taken on the first command comprises, in response to determining that one or more commands for the first MPNVM device and for a plane of the first MPNVM device different from the first plane were not sent less than a given period of time ago:
determining that the first command can wait for one or more other commands for the first MPNVM device and for a plane of the first MPNVM device different from the first plane; and
in response to determining that the first command can wait for one or more other commands for the first MPNVM device and for a plane of the first MPNVM device different from the first plane, marking the first command to be held.

21. The non-transitory computer-readable medium of claim 15, wherein the method further comprises:
identifying a second MPNVM device and a second plane of the second MPNVM device associated with a second command;
determining that one or more other commands are available for the second MPNVM device and for a plane of the second MPNVM device different from the second plane, wherein sending of the one or more other commands for execution was being delayed for matching with one or more subsequent commands for the second MPNVM device; and
in response to determining that the one or more other commands are available for the second MPNVM device and for a plane of the second MPNVM device different from the second plane, sending the second command and the one or more other commands to the second MPNVM device for execution.

* * * * *